US012645166B2

(12) United States Patent
Yamakoshi et al.

(10) Patent No.: US 12,645,166 B2
(45) Date of Patent: Jun. 2, 2026

(54) CONDUCTIVE MEMBER, CHARGING DEVICE, PROCESS CARTRIDGE, AND IMAGE FORMING APPARATUS

(71) Applicant: FUJIFILM Business Innovation Corp., Tokyo (JP)

(72) Inventors: Kenta Yamakoshi, Kanagawa (JP); Yukimi Kawabata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 19/026,559

(22) Filed: Jan. 17, 2025

(65) Prior Publication Data

US 2025/0348016 A1      Nov. 13, 2025

(30) Foreign Application Priority Data

May 9, 2024     (JP) ................................. 2024-076786

(51) Int. Cl.
 G03G 15/02 (2006.01)
 C09D 5/24 (2006.01)
 C09D 177/00 (2006.01)
 G03G 21/18 (2006.01)

(52) U.S. Cl.
 CPC ........... G03G 15/0233 (2013.01); C09D 5/24 (2013.01); C09D 177/00 (2013.01); G03G 21/1814 (2013.01)

(58) Field of Classification Search
 CPC ........... G03G 15/0233; G03G 21/1814; G03G 15/0818; G03G 15/162; G03G 21/0058; C09D 5/24; C09D 177/00
 See application file for complete search history.

(56) References Cited

U.S. PATENT DOCUMENTS

| | | | |
|---|---|---|---|
| 8,275,293 | B2 | 9/2012 | Ono |
| 9,720,343 | B2 | 8/2017 | Kamijo et al. |
| 11,586,121 | B2 | 2/2023 | Yamada et al. |
| 11,650,514 | B2 | 5/2023 | Oura et al. |

(Continued)

FOREIGN PATENT DOCUMENTS

| | | |
|---|---|---|
| JP | 2011022410 | 2/2011 |
| JP | 2017015952 | 1/2017 |

OTHER PUBLICATIONS

"Search Report of Europe Counterpart Application", issued on Jul. 1, 2025, p. 1-p. 7.

*Primary Examiner* — Sandra Brase
(74) *Attorney, Agent, or Firm* — JCIPRNET

(57) ABSTRACT

A conductive member includes a substrate; an elastic layer provided on the substrate; and a surface layer provided on the elastic layer, in which the surface layer has a sea/island structure that consists of a sea portion containing a first resin and an island portion containing a second resin, a conductive agent is unevenly distributed in an interface between the sea portion and the island portion, in observation of a cross section of the surface layer, a ratio A of a total area of the island portions in a region X from a surface of the surface layer to a depth that is 10% of a film thickness is 40% or more and 80% or less, a linked island portion where two or more of the island portions are linked is present in the region X, and a ratio B of a total area of the linked island portions to the total area of the island portions is 50% or more and 100% or less.

20 Claims, 3 Drawing Sheets

(56) References Cited

U.S. PATENT DOCUMENTS

| 2015/0205228 | A1* | 7/2015 | Ichizawa | G03G 15/162 |
| | | | | 428/339 |
| 2018/0011415 | A1* | 1/2018 | Narita | G03G 15/0233 |
| 2022/0244673 | A1* | 8/2022 | Takashima | G03G 15/0818 |
| 2022/0260937 | A1 | 8/2022 | Oura et al. | |

* cited by examiner

CONDUCTIVE MEMBER, CHARGING DEVICE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2024-076786 filed May 9, 2024.

BACKGROUND

(i) Technical Field

The present invention relates to a conductive member, a charging device, a process cartridge, and an image forming apparatus.

(ii) Related Art

JP2011-22410A discloses "a conductive member including: a substrate; an elastic layer disposed on the substrate; and a surface layer disposed on the elastic layer, the surface layer having a sea/island structure that consists of a sea portion containing a first resin and an island portion containing a second resin, and the surface layer containing carbon black at least in the island portion."

JP2017-15952A discloses "a conductive member including: a substrate; an elastic layer provided on the substrate; and a surface layer provided on the elastic layer, in which the surface layer has a sea/island structure that consists of a sea portion containing at least a first resin and a conductive agent and an island portion containing at least a second resin, an average diameter of the island portion is 100 nm or more and not more than $\frac{1}{10}$ a layer thickness of the surface layer, and the conductive agent in the sea portion is unevenly distributed in the vicinity of an interface between the sea portion and the island portion."

SUMMARY

Aspects of non-limiting embodiments of the present disclosure relate to a conductive member, a charging device, a process cartridge, and an image forming apparatus where an increase in resistance caused by discharge deterioration is suppressed is provided, as compared to a conductive member including: a substrate; an elastic layer provided on the substrate; and a surface layer provided on the elastic layer, in which the surface layer has a sea/island structure that consists of a sea portion containing a first resin and an island portion containing a second resin, a conductive agent is unevenly distributed in an interface between the sea portion and the island portion, in observation of a cross section of the surface layer, a ratio A of a total area of the island portions in a region X from a surface of the surface layer to a depth that is 10% of a film thickness is 40% or more and 80% or less, a linked island portion where two or more of the island portions are linked is present in the region X, and a ratio B of a total area of the linked island portions in the total area of the island portions is less than 50%.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the objects include the following aspects.

According to an aspect of the present disclosure, there is provided a conductive member including: a substrate; an elastic layer provided on the substrate; and a surface layer provided on the elastic layer, in which the surface layer has a sea/island structure that consists of a sea portion containing a first resin and an island portion containing a second resin, a conductive agent is unevenly distributed in an interface between the sea portion and the island portion, in observation of a cross section of the surface layer, a ratio A of a total area of the island portions in a region X from a surface of the surface layer to a depth that is 10% of a film thickness is 40% or more and 80% or less, a linked island portion where two or more of the island portions are linked is present in the region X, and a ratio B of a total area of the linked island portions to the total area of the island portions is 50% or more and 100% or less.

BRIEF DESCRIPTION OF THE DRAWINGS

Exemplary embodiment(s) of the present invention will be described in detail based on the following figures, wherein.

DETAILED DESCRIPTION

Figure 1:
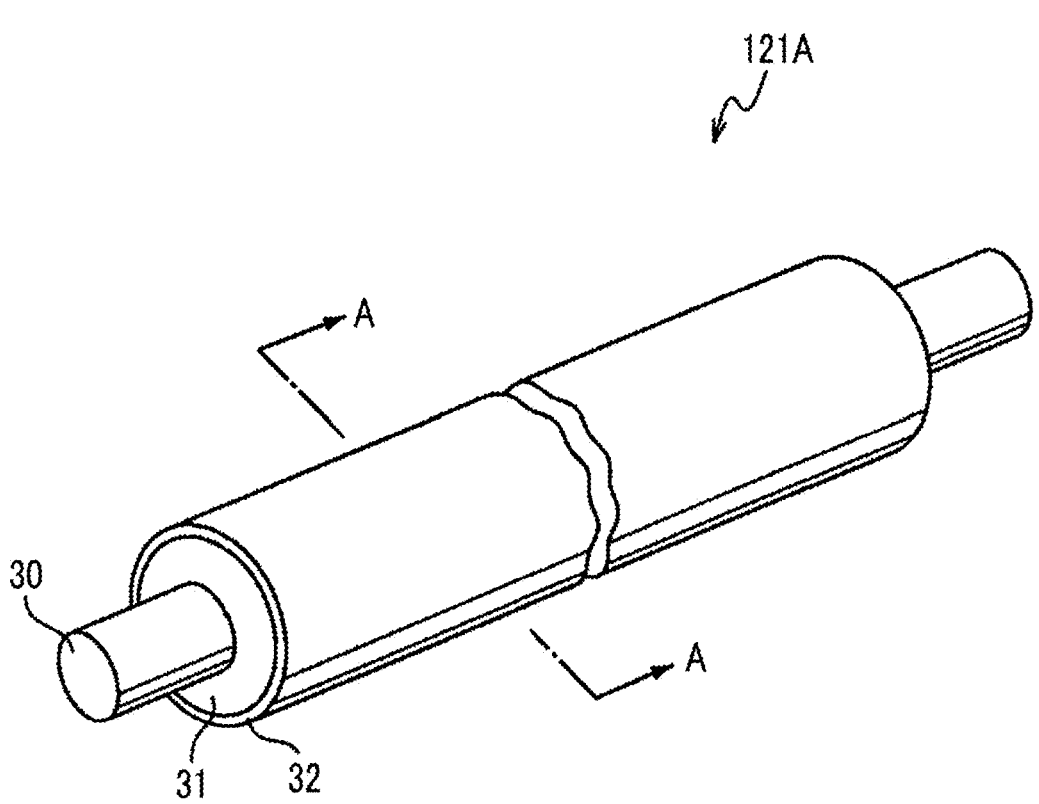
FIG. 1 is a schematic perspective view showing an example of a conductive member according to the present exemplary embodiment.

Hereinafter, an exemplary embodiment that is one example of the present invention will be described. The following description and Examples merely show the exemplary embodiment and do not limit the scope of the invention.

An upper limit value or a lower limit value described in one numerical range described in a stepwise manner in the present specification may be replaced with an upper limit value or a lower limit value in another numerical range described in a stepwise manner. In addition, an upper limit value or a lower limit value in a numerical range described in the present specification may be replaced with a value described in examples.

Each of components may include plural kinds of corresponding materials.

In a case where the amount of each of components in a composition is described and plural kinds of materials corresponding to the component are present in the composition, unless specified otherwise, the amount of the component refers to the total amount of the plural kinds of materials present in the composition.

Conductive Member

A conductive member according to the present exemplary embodiment comprises: a substrate; an elastic layer provided on the substrate; and a surface layer provided on the elastic layer, in observation of a cross section of the surface layer, a ratio A of a total area of the island portions in a region X from a surface of the surface layer to a depth that is 10% of a film thickness is 40% or more and 80% or less, a linked island portion where two or more of the island portions are linked is present in the region X, and a ratio B of a total area of the linked island portions to the total area of the island portions is 50% or more and 100% or less.

In the conductive member according to the present exemplary embodiment, an increase in resistance caused by discharge deterioration is suppressed with the above-described configuration.

The reason for this configuration is presumed to be as follows.

There is known a conductive member including: a substrate; an elastic layer provided on the substrate; and a surface layer provided on the elastic layer, in which the surface layer has a sea/island structure that consists of a sea portion containing a first resin and an island portion containing a second resin, and a conductive agent is unevenly distributed in an interface between the sea portion and the island portion.

In the surface layer of the conductive member having the above-described configuration, the conductive agent is unevenly distributed in the interface between the sea portion and the island portion. A position where the conductive agent is unevenly distributed, that is, the vicinity of the island portion functions as a conductive path. In a case where the granular island portion is finely dispersed in the outermost layer of the surface layer, the number of conductive paths increases. During discharge, the amount of the first resin in contact with the path increases, and the first resin is likely to deteriorate.

In a case where the first resin deteriorates, a resistance of the conductive member increases. For example, in a case where the conductive member is applied to a charging member in an image forming apparatus, this increase in resistance affects occurrence of fogging or the like.

In the conductive member according to the present exemplary embodiment, in observation of a cross section of the surface layer, a ratio A of a total area of the island portions in a region X (corresponding to the outermost layer) from a surface of the surface layer to a depth that is 10% of a film thickness is 40% or more and 80% or less, a linked island portion where two or more of the island portions are linked is present in the region X, and a ratio B of a total area of the linked island portions to the total area of the island portions is 50% or more and 100% or less.

This way, in a case where the ratio A of the total area of the island portions in the region X is in the above-described range, the ratio B of the total area of the linked island portions in the total area of the island portions is 50% or more and 100% or less. As a result, as compared to a case where the ratio A is the same and the ratio B is less than 50%, the number of conductive paths decreases, and the amount of the first resin in contact with the path during discharge decreases. As a result, the deterioration of the first resin is considered to be suppressed.

From the above, in the conductive member according to the present exemplary embodiment, an increase in resistance caused by discharge deterioration is presumed to be suppressed.

Hereinafter, the conductive member according to the present exemplary embodiment will be described in detail.

Figure 2:
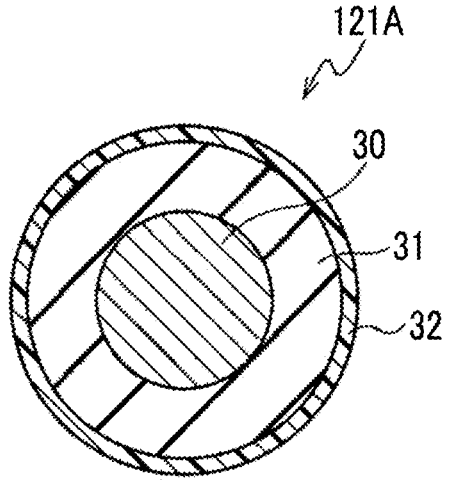
FIG. 2 is a schematic cross-sectional view showing the example of the conductive member according to the present exemplary embodiment and is a cross-sectional view taken along line A-A of FIG. 1.
Figure 3:
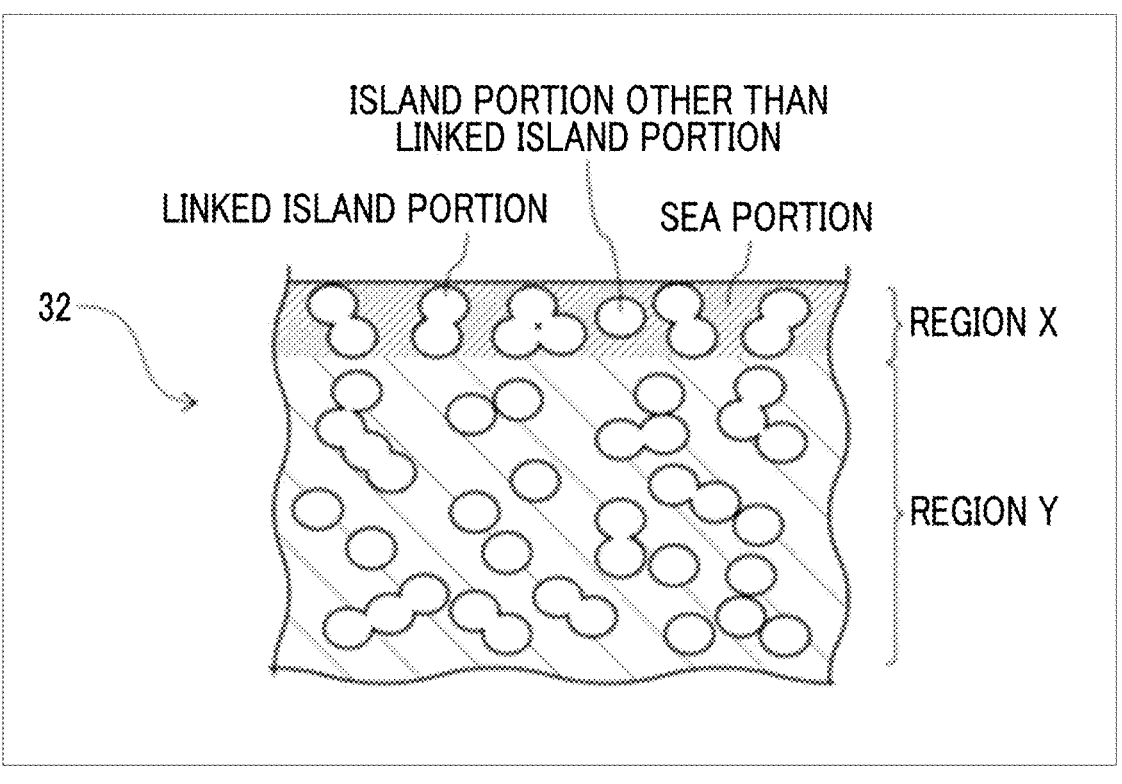
FIG. 3 is a schematic cross-sectional view showing an example of a sea/island structure in a surface layer of a conductive member according to the present exemplary embodiment.

FIG. 1 is a schematic perspective view showing one example of the conductive member according to the present exemplary embodiment. FIG. 2 is a schematic cross-sectional view showing the example of the conductive member according to the present exemplary embodiment. FIG. 2 is a cross-sectional view taken along line A-A of FIG. 1. FIG. 3 is a schematic cross-sectional view showing an example of the sea/island structure in the surface layer of a conductive member according to the present exemplary embodiment.

As shown in FIGS. 1 and 2, for example, a conductive member 121A according to the present exemplary embodiment is a roll-shaped member including a shaft 30 (an example of the substrate), an elastic layer 31 provided on an outer peripheral surface of the shaft 30, and a surface layer 32 provided on an outer peripheral surface of the elastic layer 31.

Hereinafter, each of the components in the conductive member according to the present exemplary embodiment will be described in detail. Note that a reference numeral given to each of the components will not be described in some cases.

Substrate

The substrate is a conductive cylindrical or columnar member.

In the present disclosure, "conductive" represents that a volume resistivity is less than $1 \times 10^{13}$ $\Omega$cm.

Examples of a material of the substrate include metal such as iron (for example, free-cutting steel), copper, brass, stainless steel, aluminum, or nickel. Examples of the substrate include a member (for example, a resin or a ceramic member) obtained by performing a plating treatment on the outer peripheral surface thereof and a member (for example, a resin or a ceramic member) in which a conductive agent is dispersed.

Elastic Layer

The elastic layer contains, for example, an elastic material, a conductive agent, and other additives.

Examples of the elastic material include isoprene rubber, chloroprene rubber, epichlorohydrin rubber, butyl rubber, polyurethane, silicone rubber, fluororubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethylene-propylene-diene terpolymer rubber (EPDM), acrylonitrile-butadiene copolymer rubber (NBR), natural rubber, and blended rubbers thereof.

Among these, as the elastic material, for example, polyurethane, silicone rubber, EPDM, epichlorohydrin-ethylene oxide copolymer rubber, epichlorohydrin-ethylene oxide-allyl glycidyl ether copolymer rubber, NBR, and blended rubbers thereof are preferable, and epichlorohydrin-ethylene oxide-allyl glycidyl ether copolymer rubber is more preferable.

The elastic material may be used alone or in combination of two or more kinds.

These elastic materials may be foamed or unfoamed.

Examples of the conductive agent include an electronic conductive agent and an ionic conductive agent.

Examples of the electronic conductive agent include powders of: carbon black such as Ketjen black or acetylene black; pyrolytic carbon or graphite; conductive metals or alloys such as aluminum, copper, nickel, or stainless steel; conductive metal oxides such as tin oxide, indium oxide, titanium oxide, tin oxide-antimony oxide solid solution, or tin oxide-indium oxide solid solution; and an insulating material having a surface that is treated to be conductive.

Examples of the ionic conductive agent include perchlorates or chlorates of oniums such as tetraethylammonium or lauryltrimethylammonium; and perchlorates or chlorates of alkali metals or alkali earth metals such as lithium or magnesium.

The conductive agent may be used alone or in combination of two or more kinds.

As the conductive agent, for example, carbon black is more preferable.

Specific examples of the carbon black include "ASAHI THERMAL" manufactured by Asahi Carbon Co., Ltd., "SPECIAL BLACK 350", "SPECIAL BLACK 100", "SPECIAL BLACK 250", "SPECIAL BLACK 5", "SPECIAL BLACK 4", "SPECIAL BLACK 4A", "SPECIAL BLACK 550", "SPECIAL BLACK 6", "COLOR BLACK FW200", "COLOR BLACK FW2", and "COLOR BLACK FW2V" manufactured by Orion Engineered Carbons S.A. and "MONARCH 880", "MONARCH 1000", "MONARCH 1300", "MONARCH 1400", "MOGUL-L", and "REGAL 400R" manufactured by Cabot Corporation.

The blending amount of the conductive agent is not particularly limited and, in the case of the electronic conductive agent, for example, is preferably in a range of 1 part by mass or more and 30 parts by mass or less and more preferably in a range of 15 parts by mass or more and 25 parts by mass or less with respect to 100 parts by mass of the elastic material. The blending amount of the ionic conductive agent is, for example, preferably in a range of 0.1 parts by mass or more and 5.0 parts by mass or less and more preferably in a range of 0.5 parts by mass or more and 3.0 parts by mass or less with respect to 100 parts by mass of the elastic material.

Examples of other additives that are blended in the elastic layer include typical materials that can be blended in the elastic layer, for example, a softener, a plasticizer, a curing agent, a vulcanizing agent, a vulcanization accelerator, an antioxidant, a surfactant, a coupling agent, and a filler (for example, silica or calcium carbonate).

A layer thickness of the elastic layer is, for example, preferably 1 mm or more and 15 mm or less, and more preferably 2 mm or more and 10 mm or less.

Further, the volume resistivity of the elastic layer is, for example, preferably $1 \times 10^3$ Ωcm or more and $1 \times 10^{14}$ Ωcm or less.

Surface Layer

Composition of Surface Layer

The surface layer has a sea/island structure that consists of a sea portion containing a first resin and an island portion containing a second resin, and a conductive agent is unevenly distributed in an interface between the sea portion and the island portion.

Here, "sea/island structure" refers to a structure where at least two resins are mixed in an incompatible state and the island portion as a dispersed phase is provided in the sea portion as a continuous phase. That is, the surface layer contains two or more kinds of resins including the first resin and the second resin.

The sea/island structure is formed by adjusting a difference in solubility parameter (SP value) between the first resin and the second resin and a mixing ratio between the first resin and the second resin. From the viewpoint of easily forming the sea/island structure, the difference in SP value between the first resin and the second resin is, for example, preferably 2 or more and 10 or less.

The mixing ratio between the first resin and the second resin will be described below.

A method of calculating the solubility parameter (SP value) is a method described in "Polymer Handbook 4th Edition, John Wiley & Sons" VII 680 to 683. The solubility parameters of major resins are described in VII 702 to 711 of the document.

In addition, in the surface layer, the conductive agent is unevenly distributed in the interface between the sea portion and the island portion, and the state where the conductive agent is unevenly distributed can be represented by a ratio (also referred to as the uneven distribution ratio of the conductive agent) of the conductive agent present in a region within 100 nm from the interface between the sea portion and the island portion toward the sea portion side. Specifically, the conductive agent being unevenly distributed in the interface between the sea portion and the island portion represents that the uneven distribution ratio of the conductive agent present in the region within 100 nm from the interface between the sea portion and the island portion toward the sea portion side is 80% or more. The uneven distribution ratio of the conductive agent is preferably, for example, as high as possible and more preferably 85% or more.

The uneven distribution ratio of the conductive agent is measured using the next method.

A cut sample of the surface layer cut in a thickness direction using a cryomicrotome method is prepared, this sample is observed with a scanning electron microscope, and any ten 4 μm×4 μm square regions including the sea portion and the island portion are selected. In each of the regions, the area of the conductive agent in the entire regions, the area of the conductive agent in the sea portion, and the area of the conductive agent in the region within 100 nm from the interface toward the sea portion side are measured. In a case where the layer thickness of the surface layer is less than 4 μm, the number of regions to be observed increases such that the observation areas are the same.

The uneven distribution ratio (%) of the conductive agent is obtained by calculating {the area of the conductive agent in the region within 100 nm from the interface toward the sea portion side÷the area of the conductive agent in the sea portion×100} and obtaining an arithmetic mean value of the ten regions.

Examples of the first resin include an acrylic resin, a cellulose resin, a polyamide resin (including copolymer nylon), a polyurethane resin, a polycarbonate resin, a polyester resin, a polyethylene resin, a polyvinyl resin, a polyarylate resin, a styrene-butadiene resin, a melamine resin, an epoxy resin, a urethane resin, a silicone resin, a fluororesin (for example, a tetrafluoroethylene perfluoroalkyl vinyl ether copolymer, a polytetrafluoroethylene-hexafluoropropylene copolymer, or polyvinylidene fluoride), and a urea resin. The copolymer nylon is a copolymer containing any one kind or plural kinds among nylon 610, nylon 11, and nylon 12 as polymerization units, and may further contain nylon 6 or nylon 66 as other polymerization units. As the first resin, the elastic material that is blended in the elastic layer may be applied.

The first resin may be used alone or in combination of two or more kinds thereof.

From the viewpoint of obtaining electrical characteristics, resistance to contamination, moderate hardness, and maintainability of the surface layer, and the viewpoint of obtaining dispersion suitability or coating film forming properties of the conductive agent in a case where the surface layer is formed using a dispersion liquid, the first resin is preferably, for example, a polyamide resin (for example, nylon) and more preferably an N-methoxymethylated polyamide resin (for example, methoxymethylated nylon).

Examples of the second resin include a polyvinyl butyral resin, a polystyrene resin, and a polyvinyl alcohol resin.

The second resin may be used alone or in combination of two or more kinds thereof.

From the viewpoint of obtaining electrical characteristics, resistance to contamination, moderate hardness, and maintainability of the surface layer, and the viewpoint of obtaining dispersion suitability or coating film forming properties of the conductive agent in a case where the surface layer is formed using a dispersion liquid, the second resin is, for example, preferably a polyvinyl butyral resin.

From the above, in the present exemplary embodiment, for example, it is preferable that the first resin is a polyamide resin and the second resin is a polyvinyl butyral resin. This combination is preferable, for example, from the viewpoint of obtaining electrical characteristics, resistance to contamination, moderate hardness, and maintainability of the surface layer, and the viewpoint of obtaining dispersion suitability or coating film forming properties of the conductive agent in a case where the surface layer is formed using a dispersion liquid, and is also preferable from the viewpoint of easily forming the sea/island structure in the surface layer and the viewpoint that the conductive agent is easily unevenly distributed between the sea portion and the island portion.

The content of the first resin in the surface layer is, for example, preferably 50 parts by mass or more and 90 parts by mass or less, more preferably 60 parts by mass or more and 85 parts by mass or less, and still more preferably 70 parts by mass or more and 80 parts by mass or less with respect to 100 parts by mass of a total mass of the first resin and the second resin.

The content of the second resin in the surface layer is, for example, preferably 10 parts by mass or more and 50 parts by mass or less, more preferably 15 parts by mass or more and 40 parts by mass or less, and still more preferably 20 parts by mass or more and 30 parts by mass or less with respect to 100 parts by mass of the total mass of the first resin and the second resin.

By adjusting the content of the first resin and the second resin to be in the above-described range, the ratio A in the sea/island structure of the outermost layer (region X) is likely to be in the above-described numerical range. By adjusting the content of the first resin and the second resin to be in the above-described range, the electrical characteristics, the resistance to contamination, the moderate hardness (mechanical strength), and the maintainability of the surface layer are likely to be obtained.

The total content of the first resin and the second resin is, for example, preferably 50 mass % or more and 95 mass % or less, more preferably 60 mass % or more and 90 mass % or less, and still more preferably 70 mass % or more and 85 mass % or less with respect to the total mass of the surface layer.

Examples of the conductive agent include an electronic conductive agent and an ionic conductive agent.

Examples of the electronic conductive agent include powders of: carbon black such as Ketjen black or acetylene black; pyrolytic carbon or graphite; conductive metals or alloys such as aluminum, copper, nickel, or stainless steel; conductive metal oxides such as tin oxide, indium oxide, titanium oxide, tin oxide-antimony oxide solid solution, or tin oxide-indium oxide solid solution; and an insulating material having a surface that is treated to be conductive.

Examples of the ionic conductive agent include perchlorates or chlorates of oniums such as tetraethylammonium or lauryltrimethylammonium; and perchlorates or chlorates of alkali metals or alkali earth metals such as lithium or magnesium.

The conductive agent may be used alone or in combination of two or more kinds.

As the conductive agent, for example, carbon black is preferable.

Carbon black is more likely to be unevenly distributed in the interface between the sea portion and the island portion of the surface layer as compared to a conductive agent other than carbon black.

Examples of the carbon black include Ketjen black, acetylene black, and oxidized carbon black having a pH of 5 or less. More specific examples of the carbon black include "SPECIAL BLACK 350", "SPECIAL BLACK 100", "SPECIAL BLACK 250", "SPECIAL BLACK 5", "SPECIAL BLACK 4", "SPECIAL BLACK 4A", "SPECIAL BLACK 550", "SPECIAL BLACK 6", "COLOR BLACK FW200", "COLOR BLACK FW2", and "COLOR BLACK FW2V" manufactured by Orion Engineered Carbons S.A. and "MONARCH 880", "MONARCH 1000", "MONARCH 1300", "MONARCH 1400", "MOGUL-L", and "REGAL 400R" manufactured by Cabot Corporation.

The average particle size of the carbon black is, for example, preferably 15 nm or more and 30 nm or less, more preferably 15 nm or more and 25 nm or less, and still more preferably 15 nm or more and 20 nm or less.

By adjusting the average particle size of the carbon black to be 15 nm or more and 30 nm or less, carbon black particles are more dense and are more likely to be unevenly distributed in the interface between the sea portion and the island portion. As a result, a current is more likely to flow between the conductive agent particles.

The average particle size of the carbon black is a value measured using a transmission electron microscope (TEM).

The measurement method is as follows.

First, the surface layer is cut using a microtome, and the obtained cross section is observed with a transmission electron microscope (TEM). The diameter of a circle equivalent to the projected area of each of 50 particles of the carbon black is obtained as the particle size, and the average value thereof is obtained as the average particle size.

The content of the conductive agent in the surface layer is, for example, preferably 10 parts by mass or more and 20 parts by mass or less and more preferably 12 parts by mass or more and 15 parts by mass or less with respect to 100 parts by mass of the total mass of the first resin and the second resin.

In a case where the content of the conductive agent is 10 parts by mass or more with respect to 100 parts by mass of the total mass of the first resin and the second resin, a state where the conductive agent particles present in the interface between the sea portion and the island portion are close to each other is likely to be adopted, and a current is more likely to flow between the conductive agent particles. As a result, a conductive path is likely to be formed due to the conductive agent present in the interface between the sea portion and the island portion. Further, since the state of the island portion in the outermost layer (region X) of the surface layer is as described above, it is presumed that the number of conductive paths is limited, deterioration of the first resin is effectively suppressed, and an increase in resistance caused by discharge deterioration is suppressed.

In addition, in a case where the content of the conductive agent is 10 parts by mass or more with respect to 100 parts by mass of the total mass of the first resin and the second resin, A conductive path is sufficiently formed due to the conductive agent in the interface between the sea portion and the island portion, and intended discharge characteristics are likely to be obtained.

Configuration of Outermost Layer (Region X) of Island Portion

In observation of a cross section of the surface layer, a ratio A of a total area of the island portions in a region X from a surface of the surface layer to a depth that is 10% of a film thickness is 40% or more and 80% or less, a linked island portion where two or more of the island portions are linked is present in the region X, and a ratio B of a total area of the linked island portions to the total area of the island portions is 50% or more and 100% or less.

The linked island portion in the region X will be described using FIG. 3. FIG. 3 is a schematic diagram showing the sea/island structure and does not show the conductive agent.

As shown in FIG. 3, in the region X, the sea portion that is a continuous phase and the island portion that is a dispersed phase are present. Further, among the island portions, a linked island portion where two or more granular island portions are linked and an island portion other than the linked island portion (that is, one granular island portion that is present alone) are present.

The ratio A shows a ratio of the total area of the island portions (the sum of the areas of all of the island portions present in the region X) to the total area of the region X. In addition, the ratio of the total area of the linked island portions where two or more island portions present in the region X are linked to the total area of the island portions in the region X is shown.

The ratio A shows the ratio of the total area of the island portions to the total area of the region X. In the region X that is the outermost layer of the surface layer, by adjusting the ratio A of the area of the island portions to be in the appropriate range, while maintaining the mechanical strength, the interface between the sea portion and the island portion for unevenly distributing the conductive agent is likely to be sufficiently present, and a current is likely to flow.

From these viewpoints, the ratio A is 40% or more and 80% or less and is, for example, preferably 50% or more and 70% or less and more preferably 55% or more and 65% or less.

The ratio B shows the ratio of the total area of the linked island portions where two or more island portions present in the region X are linked to the total area of the island portions in the region X. By increasing the ratio B, a discharge path is limited. Therefore, the deterioration of the first resin is suppressed, and an increase in resistance caused by discharge deterioration is suppressed.

From these viewpoints, the ratio B is 50% or more and 100% or less and is, for example, preferably 80% or more and 100% or less and more preferably 85% or more and 100% or less.

From the viewpoint of suppressing an increase in resistance caused by discharge deterioration while maintaining mechanical strength and having sufficient conductivity in the surface layer, for example, it is preferable that the ratio A is 50% or more and 70% or less and the ratio B is 80% or more and 100% or less.

In addition, from the viewpoint obtaining intended conductivity while maintaining mechanical strength, for example, the following aspect is preferable.

That is, in observation of a cross section of the surface layer, a ratio C of a total area of the island portions in a region Y from a surface of the surface layer to a depth that is more than 10% of a film thickness is, for example, preferably 50% or more and 70% or less, and more preferably 55% or more and 65% or less.

In addition, a ratio D of the total area of the linked island portions to the total area of the island portions in the region Y is, for example, preferably 80% or more and 100% or less, and more preferably 85% or more and 100% or less.

Further, a difference between the ratio A and the ratio C is, for example, preferably as small as possible and is preferably 15% or less and more preferably 10% or less. The lower limit of the difference between the ratio A and the ratio C may be 0 and may be 5% or more.

Further, a difference between the ratio B and the ratio D is, for example, preferably as small as possible and is preferably 15% or less and more preferably 10% or less. The lower limit of the difference between the ratio B and the ratio D may be 0 and may be 5% or more.

The ratios A to D are values measured as follows.

A cut sample of the surface layer cut in a thickness direction using a cryomicrotome method is prepared. In the cut sample, a cut surface of the surface layer cut using a cryomicrotome method is observed with a scanning electron microscope.

In the observation image, any 10 regions in a region corresponding to the region X from the surface of the surface layer to a depth that is 10% of the film thickness are selected. In each of the regions, the area of the region, the total area of the island portions in the region, and the total area of the linked island portions in the region are measured. The arithmetic mean value of the ratios of the total areas of the island portions to the areas of the ten measured regions is calculated as the ratio A. In addition, the arithmetic mean value of the ratios of the total areas of the linked island portions to the total area of the island portions in the ten measured regions is calculated as the ratio B.

Likewise, any ten regions in a region corresponding to the region Y from the surface of the surface layer to a depth that is more than 10% of the film thickness are selected. In each of the regions, the area of the region, the total area of the island portions in the region, and the total area of the linked island portions in the region are measured. The arithmetic mean value of the ratios of the total areas of the island portions to the areas of the ten measured regions is calculated as the ratio C. In addition, the arithmetic mean value of the ratios of the total areas of the linked island portions to the total area of the island portions in the ten measured regions is calculated as the ratio D.

In the present disclosure, "linked island portion" refers to a portion where two or more granular island portions are linked.

In the linked island portion, island portions (that can be fitted as a circular graphic) independent of the above-described cross-sectional view are extracted, the average diameter thereof is calculated, and a reference circle is set. A portion that is expected to be a linked island portion and where two or more reference circles can be disposed is determined as a linked island portion. Note that the overlapping of the disposed reference circles is allowed up to 50%.

Diameter of Island Portion

In the conductive member according to the present exemplary embodiment, in a cross section (a cross section of any of the region X and the region Y) of the surface layer, the diameter of the linked island portion is, for example, preferably 500 nm or more and 1500 nm or less and more preferably 500 nm or more and 1000 nm or less.

In addition, in a cross section (a cross section of any of the region X and the region Y) of the surface layer, the diameter of the island portion other than the linked island portion is, for example, preferably 100 nm or more and 500 nm or less and more preferably 300 nm or more and 500 nm or less.

The diameter of the island portion is a value measured as follows.

A cut sample of the surface layer cut in a thickness direction using a cryomicrotome method is prepared. In the cut sample, a cut surface of the surface layer cut using a cryomicrotome method is observed with a scanning electron microscope. Any ten linked island portions and any 10 island portions other than the linked island portion are selected. Regarding each of the ten island portions, the maximum length (a so-called major axis length) of a line drawn between any two points on a contour line of the island portion is measured, and the average value of the ten major axis lengths is obtained as the diameter (nm) of the island portion.

Layer Thickness of Surface Layer

The layer thickness of the surface layer is, for example, preferably 3 μm or more and 25 μm or less, more preferably 5 μm or more and 20 μm or less, and still more preferably 6 μm or more and 15 μm or less.

The layer thickness of the surface layer is measured by cutting the surface layer in the thickness direction and observing the obtained cross section with an optical microscope.

Using the same method as the measurement method, the layer thickness of the elastic layer can be measured.

Absorbance of Conductive Member

In the conductive member according to the present exemplary embodiment, in a case where the first resin is a polyamide resin, for example, it is preferable that an absorbance ratio (absorbance aged/absorbance ini) at an N—H bending vibration ($1540$ cm$^{-1}$) position derived from amide of the surface layer is 0.20 or more, the absorbance being measured by FT-IR before and after a discharge test in which a voltage of 1.1 kV is applied to the conductive member and the conductive member is discharged to an aluminum element tube while being rotated at a speed of 150 rpm.

The absorbance ratio (absorbance aged/absorbance ini) is an index representing that, as the value thereof increases, deterioration of the polyamide resin that is the first resin is suppressed.

Therefore, the absorbance ratio (absorbance aged/absorbance ini) is, for example, preferably 0.20 or more and more preferably 0.25 or more from the viewpoint of further suppressing an increase in resistance caused by discharge deterioration.

The upper limit of the absorbance ratio is, for example, 1 and may be 0.75 or less.

The discharge test and a method of measuring the absorbance ratio are as follows.

A high voltage power supply (for example, a high voltage amplifier MODEL 610E, manufactured by Trek, Inc.) is connected to the conductive member. Using the high voltage power supply, a voltage of 1.1 kV is applied to the conductive member and the conductive member is discharged to an aluminum element tube while being rotated at a speed of 150 rpm.

Specifically, the discharge test is performed in an environment of 22° C. and 55 RH for 72 hours.

Before and after the above-described discharge test, an absorbance at an N—H bending vibration ($1540$ cm$^{-1}$)

position derived from amide of the surface layer is measured by FT-IR, and a ratio (absorbance aged/absorbance ini) is calculated.

Specifically, the surface layer is cut from the conductive member before and after the discharge test, and the cut measurement sample is provided in a measurement portion of FT-IR spectrometer (Fourier transform infrared spectrophotometer, for example, product name: IRSpirit, manufactured by Shimadzu Corporation) to perform the measurement.

Measurement conditions are scanning speed: 0.2 cm/s, resolution: 4 cm$^{-1}$, number of times of integration: 32, and region: 600 to 4000 cm$^{-1}$.

From the obtained infrared absorption spectrum, an absorbance at an N—H bending vibration ($1540$ cm$^{-1}$) position derived from amide is measured. The absorbance at the N—H bending vibration ($1540$ cm$^{-1}$) position derived from amide of the measurement sample before the discharge test is set as the absorbance ini, the absorbance at the N—H bending vibration ($1540$ cm$^{-1}$) position derived from amide of the measurement sample after the discharge test is set as the absorbance aged, and the absorbance ratio (absorbance aged/absorbance ini) is calculated.

Method of Manufacturing Conductive Member

One example of a method of manufacturing the conductive member according to the present exemplary embodiment will be described below.

First, a roll-shaped member in which the elastic layer is provided on an outer peripheral surface of a cylindrical or columnar substrate is prepared. A method of manufacturing the roll-shaped member is not particularly limited. For example, a manufacturing method of winding a mixture containing an elastic material and optionally further containing a conductive agent and other additives around the cylindrical or columnar substrate and heating and vulcanizing the mixture to form the elastic layer can be used.

A method of providing the surface layer on the outer peripheral surface of the elastic layer is not particularly limited. For example, a method is preferable in which a dispersion liquid in which the first resin, the second resin, and the conductive agent are dissolved and dispersed in a solvent is applied to the outer peripheral surface of the elastic layer of the roll-shaped member and the applied dispersion liquid is dried to form the surface layer.

Examples of a method of applying the dispersion liquid to the outer peripheral surface of the elastic layer of the roll-shaped member include a blade coating method, a wire bar coating method, a spray coating method, a dip coating method, a bead coating method, an air knife coating method, and a curtain coating method.

By controlling drying conditions in the step of applying the dispersion liquid to the outer peripheral surface of the elastic layer and drying the applied dispersion liquid, the surface layer including the outermost layer (region X) as described above can be obtained.

The drying conditions in the step of drying the dispersion liquid applied to the outer peripheral surface of the elastic layer are, for example, preferably conditions where drying is gently performed. By gently performing the drying of the dispersion liquid, aggregation of the island portions is likely to occur, and the surface layer that includes the outermost layer (region X) including the linked island portions as described above can be obtained.

As the conditions where drying is gently performed, for example, a dew point of an environment during drying is preferably 5° C. or higher and 25° C. or lower and more preferably 10° C. or higher and 20° C. or lower.

In addition, as the conditions where drying is gently performed, for example, in a case where air is blown to the dispersion liquid applied to the outer peripheral surface of the elastic layer during air drying, a wind speed is preferably 0.4 m/s or more and 1.5 m/s or less and more preferably 0.5 m/s or more and 1.0 m/s or less.

In particular, by combining the dew point and the wind speed condition during air drying, the conductive member according to the present exemplary embodiment is likely to be obtained.

Use of Conductive Member

The conductive member according to the present exemplary embodiment is used for, for example, a charging roll for charging a surface of the image carrier in an electrophotographic copier, an electrostatic printer, or the like, a transfer roll for transferring a toner image formed on the image carrier to a transfer medium, a toner transport roll for transporting toner to the image carrier, a conductive roll for power feeding or driving in combination with a conductive belt that electrostatically transports paper, or a cleaning roll for removing toner on the image carrier. In addition, in an ink jet type image forming apparatus, for example, a feed roll for charging an intermediate transfer medium before discharging ink from an ink jet head is used.

Hereinabove, the configuration of the conductive member 121A that is the roll-shaped member is described as the conductive member according to the present exemplary embodiment. However, the conductive member according to the present exemplary embodiment is not limited to this configuration and may be an endless belt-shaped member or a sheet-shaped member.

In addition, the conductive member according to the present exemplary embodiment may have a configuration in which, for example, an adhesive layer (primer layer) that is provided between the substrate and the elastic layer, a resistance adjusting layer or a transition preventing layer that is provided between the elastic layer and the surface layer, or a coating layer (protective layer) that is provided on an outer side (outermost surface) of the surface layer is provided.

Charging Device, Image Forming Apparatus, and Process Cartridge

A charging device according to the present exemplary embodiment includes the conductive member according to the present exemplary embodiment.

It is preferable that the charging device according to the present exemplary embodiment includes, for example, the conductive member according to the present exemplary embodiment, in which an image carrier is charged using a contact charging method.

A contact width of the conductive member with the image carrier in a circumferential direction (that is, a width of the conductive member in the circumferential direction in a region where the image carrier and the conductive member are in contact with each other) is not particularly limited and is, for example, in a range of 0.5 mm or more and 5 mm or less and preferably in a range of 1 mm or more and 3 mm or less.

A process cartridge according to the present exemplary embodiment includes, for example, a charging device that is attached to and detached from an image forming apparatus having a configuration described below and charges a surface of the image carrier. As the charging device, the charging device according to the present exemplary embodiment is applied.

Optionally, the process cartridge according to the present exemplary embodiment may further include, for example, at least one kind selected from the group consisting of an image carrier, an electrostatic latent image forming device that forms an electrostatic latent image on the charged surface of the image carrier, a developing device that develops the latent image formed on the surface of the image carrier with toner to form a toner image, a transfer device that transfers the toner image formed on the surface of the image carrier to a recording medium, and a cleaning device that cleans the surface of the image carrier.

The image forming apparatus according to the present exemplary embodiment includes: an image carrier; a charging device that charges a surface of the image carrier; an electrostatic latent image forming device that forms an electrostatic latent image on the charged surface of the image carrier; a developing device that develops the electrostatic latent image formed on the surface of the image carrier with a developer containing toner to form a toner image; and a transfer device that transfers the toner image to a surface of a recording medium. As the charging device, the charging device according to the present exemplary embodiment is applied.

Next, the image forming apparatus and the process cartridge according to the present exemplary embodiment will be described with reference to the drawings.

Figure 4:
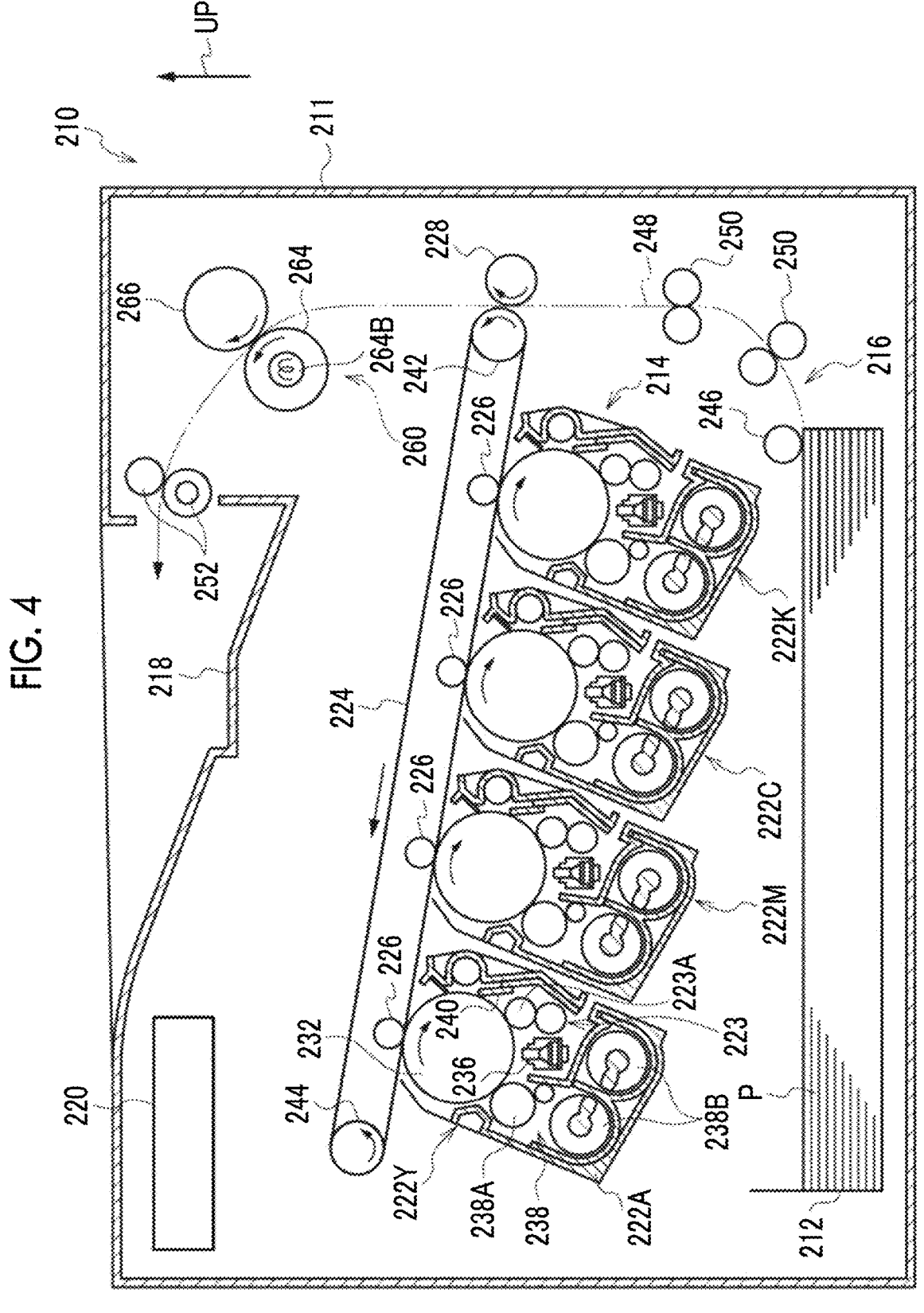
FIG. 4 is a schematic configuration diagram showing an example of an image forming apparatus according to the present exemplary embodiment.

FIG. 4 is a schematic configuration diagram showing the image forming apparatus according to the present exemplary embodiment. Arrow UP shown in the drawing indicates an upward side in the vertical direction.

As shown in FIG. 4, an image forming apparatus 210 includes an image forming apparatus body 211 that accommodates each of the components. In the image forming apparatus body 211, an accommodation portion 212 that accommodates a recording medium P such as paper, an image forming portion 214 that forms an image on the recording medium P, a transport portion 216 that transports the recording medium P from the accommodation portion 212 to the image forming portion 214, and a controller 220 that controls an operation of each of the portions of the image forming apparatus 210 are provided. In addition, a discharge portion 218 to which the recording medium P on which the image is formed by the image forming portion 214 is discharged is provided above the image forming apparatus body 211.

The image forming portion 214 includes: image forming units 222Y, 222M, 222C, and 222K (hereinafter, referred to as "222Y to 222K") that form toner images of colors including yellow (Y), magenta (M), cyan (C), and black (K), respectively; an intermediate transfer belt 224 (an example of a transfer target) to which the toner images formed by the image forming units 222Y to 222K are transferred; a first transfer roll 226 (an example of a transfer roll) that transfers the toner images formed by the image forming units 222Y to 222K to the intermediate transfer belt 224; and a second transfer roll 228 (an example of a transfer member) that transfers the toner images transferred to the intermediate transfer belt 224 by the first transfer roll 226 from the intermediate transfer belt 224 to the recording medium P. The image forming portion 214 is not limited to the above-described configuration and may adopt another configuration as long as an image can be formed on the recording medium P (an example of a transfer target).

Here, a unit consisting of the intermediate transfer belt 224, the first transfer roll 226, and the second transfer roll 228 corresponds to an example of the transfer device. This unit may be configured as a cartridge (process cartridge).

The image forming units 222Y to 222K are disposed side by side in a center portion in a vertical direction of the image forming apparatus 210 in a state where the image forming units 222Y to 222K are inclined with respect to a horizontal direction. In addition, each of the image forming units 222Y to 222K includes a photoreceptor 232 (an example of the image carrier) that rotates in one direction (for example, a clockwise direction in FIG. 4). The image forming units 222Y to 222K have the same configuration. Therefore, reference numerals of the portions of the image forming units 222M, 222C, and 222K are not shown in FIG. 4.

In the vicinity of each of the photoreceptors 232, in order from the upstream side in the rotation direction of the photoreceptor 232, a charging device 223 including a charging roll 223A (an example of a charging member) that charges the photoreceptor 232, an exposure device 236 (an example of the electrostatic latent image forming device) that exposes the photoreceptor 232 charged by the charging device 223 to form an electrostatic latent image on the photoreceptor 232, a developing device 238 that develops the latent image formed on the photoreceptor 232 by the exposure device 236 to form a toner image, and a removal member (for example, a cleaning blade) 240 that comes into contact with the photoreceptor 232 and removes toner remaining on the photoreceptor 232 are provided.

Here, the photoreceptor 232, the charging device 223, and the exposure device 236, the developing device 238, and the removal member 240 are integrally held by a housing (case) 222A to configure a cartridge (process cartridge).

As the exposure device 236, a self-scanning LED print head is applied. The exposure device 236 may be an optical exposure device that exposes the photoreceptor 232 from a light source through a polygon mirror.

The exposure device 236 forms a latent image based on an image signal transmitted from the controller 220. Examples of the image signal transmitted from the controller 220 include an image signal acquired from an external device by the controller 220.

The developing device 238 includes: a developer supply member 238A that supplies a developer to the photoreceptor 232; and a plurality of transport members 238B that transport the developer given to the developer supply member 238A while agitating the developer.

The intermediate transfer belt 224 is formed in an annular shape and is disposed above the image forming units 222Y to 222K. On an inner peripheral side of the intermediate transfer belt 224, winding rolls 242 and 244 around which the intermediate transfer belt 224 is wound are provided. Any one of the winding rolls 242 and 244 rotates such that intermediate transfer belt 224 circulates and moves (rotates) in one direction (for example, a counterclockwise direction in FIG. 4) while being in contact with the photoreceptor 232. The winding roll 242 is configured as a facing roll that faces the second transfer roll 228.

The first transfer roll 226 faces the photoreceptor 232 with the intermediate transfer belt 224 interposed therebetween. A position between the first transfer roll 226 and the photoreceptor 232 is a first transfer position at which the toner image formed on the photoreceptor 232 is transferred to the intermediate transfer belt 224.

The second transfer roll 228 faces the winding roll 242 with the intermediate transfer belt 224 interposed therebetween. A position between the second transfer roll 228 and the winding roll 242 is a second transfer position at which the toner image transferred to the intermediate transfer belt 224 is transferred to the recording medium P.

In the transport portion 216, a feed roll 246 that feeds the recording medium P accommodated in the accommodation portion 212, a transport path 248 through which the recording medium P fed by the feed roll 246 is transported, and a plurality of transport rolls 250 that are disposed along the transport path 248 and transport the recording medium P fed by the feed roll 246 to the second transfer position are provided.

A fixing device 260 that fixes the toner image formed on the recording medium P by the image forming portion 214 to the recording medium P is provided downstream of the second transfer position in the transport direction.

In the fixing device 260, a heating roll 264 that heats the image on the recording medium P and a pressurization roll 266 that is an example of a pressurization member are provided. In the heating roll 264, a heating source 264B is provided.

A discharge roll 252 that discharges the recording medium P to which the toner image is fixed to the discharge portion 218 is provided downstream of the fixing device 260 in the transport direction.

Next, in the image forming apparatus 210, an image forming operation of forming an image on the recording medium P will be described.

In the image forming apparatus 210, the recording medium P fed from the accommodation portion 212 by the feed roll 246 is transported to the second transfer position by the plurality of transport rolls 250.

On the other hand, in each of the image forming units 222Y to 222K, the photoreceptor 232 charged by the charging device 223 is exposed by the exposure device 236 to form a latent image on the photoreceptor 232. The latent image is developed by the developing device 238 to form a toner image on the photoreceptor 232. The toner images of the colors formed by the image forming units 222Y to 222K overlap each other on the intermediate transfer belt 224 at the first transfer position such that a color image is formed. The color image formed on the intermediate transfer belt 224 is transferred to the recording medium P at the second transfer position.

The recording medium P to which the toner image is transferred is transported to the fixing device 260, and the transferred toner image is fixed by the fixing device 260. The recording medium P to which the toner image is fixed is discharged to the discharge portion 218 by the discharge roll 252. As described above, the series of image forming operations are performed.

The image forming apparatus 210 according to the present exemplary embodiment is not limited to the above-described configuration. For example, well-known image forming apparatus such as a direct transfer type image forming apparatus that directly transfers the toner image formed on each of the photoreceptors 232 of the image forming units 222Y to 222K to the recording medium P may be adopted.

EXAMPLES

Hereinafter, Examples of the present invention will be described, but the present invention is not limited to these Examples. In the following description, unless specified otherwise, "part(s)" and "%" represent "part(s) by mass" and "mass %".

Example 1: Preparation of Conductive Member

Formation of Elastic Layer 15 parts by mass of a conductive agent (carbon black, ASAHI THERMAL manufactured by Asahi Carbon Co., Ltd.), 1 part by mass of a vulcanizing agent (sulfur, 200-mesh, manufactured by Tsurumi Chemical Industry Co., Ltd.) as an additive to be blended in the elastic layer, and 2.0 parts by mass of a vulcanization accelerator (NOCCELER DM, manufactured by Ouchi Shinko Chemical Industrial Co., Ltd.) as another additive to be blended in the elastic layer are added to 100 parts by mass of an elastic material (epichlorohydrin-ethylene oxide-allyl glycidyl ether copolymer rubber) to obtain a mixture, and the mixture is kneaded in an open roll to obtain a composition for forming an elastic layer. The composition for forming an elastic layer is wound around an outer peripheral surface of a shaft (substrate) having a diameter of 8 mm formed of SUS 303 using a press forming machine through an adhesive layer, is put into a furnace at a temperature of 180° C., and is heated for 30 minutes to form an elastic layer having a layer thickness of 3.5 mm on the shaft. The outer peripheral surface of the elastic layer is polished to obtain a conductive elastic roll having a diameter of 14 mm that includes the elastic layer having a layer thickness of 3.0 mm.

Formation of Surface Layer 15 parts by mass of a composition consisting of 76 parts by mass of a polyamide resin (N-methoxymethylated nylon, manufactured by Nagase ChemteX Corporation/F30K) as a first resin, 24 parts by mass of a polyvinyl butyral resin (S-LEC BL-1/manufactured by Sekisui Chemical Co., Ltd.) as a second resin, 13 parts by mass of carbon black (MON-ARCH 1000/manufactured by Cabot Corporation) as a conductive agent, 10 parts by mass of a porous polyamide filler (ORGASOL 2001 UD NAT1/manufactured by Arkema S.A.), 1.0 part by mass of an acid catalyst (NACURE 4167/manufactured by King Industries, Inc.), and 1 part by mass of a leveling agent (polyether modified polydimethyl-siloxane (BYK 307/manufactured by BYK) as a polyether modified polysiloxane) is diluted with 85 parts by mass of methanol and is dispersed with a bead mill to obtain a dispersion liquid. In an environment of a temperature of 24° C. and a dew point of 5° C., the outer peripheral surface of the elastic layer of the obtained conductive elastic roll is dipped in the obtained dispersion liquid, and is dried with air. During the air drying, an air volume circulating in a booth is adjusted such that a wind speed in the vicinity of a workpiece is 0.7 m/s. Next the applied dispersion liquid is heated at 140° C. for 30 minutes for crosslinking, and forms a surface layer having a thickness of 10 μm. As a result, a conductive member is obtained.

Examples 2 to 13 and Comparative Examples 1 to 3

Conductive members are obtained using the same method as the method of Example 1, except that the amount (part(s)) of the first resin, the amount (part(s)) of the second resin, the amount (part(s)) of the conductive agent, the dew point of the drying environment, and the wind speed of the air drying are appropriately changed as shown in Table 1 during the formation of the surface layer.

Abbreviations in Table 1 are as described below.

First Resin.

PA1: a polyamide resin (manufactured by Nagase ChemteX Corporation/F30K)

Second Resin

PVB1: a polyvinyl butyral resin (S-LEC BM-1/manufactured by Sekisui Chemical Co., Ltd.)

The following characteristics of the conductive member obtained in each of the examples are measured using the methods described above. The obtained results are listed in Table 1.

"Ratio A"

"Ratio B"

"Uneven Distribution Ratio of Conductive Agent"

"Absorbance Ratio"

Evaluation

Evaluation of Increase in Resistance

The conductive member obtained in Example or Comparative Example as a charging roll of a charging device is incorporated into a modified machine of an image forming apparatus (DocuCentre-V C7776, manufactured by Fujifilm Business Innovation Corporation), and 5000 A4 images having an image density of 30% are printed in a low temperature low humidity environment under conditions of 10° C. and 15% RH. A difference (an average value of three points in the axial direction) between a resistance value (initial resistance value (Log Ω)) of the conductive member before the incorporation into the modified machine and a resistance value (resistance value (Log Ω) after Run) of the conductive member after printing 5000 A4 images is obtained, and the difference is represented by a resistance A (Log Ω).

Evaluation of Fogging

In a case where the same image formation as in the evaluation of color streaks is performed and the 5000th printed paper is observed, whether or not fogging occurs is evaluated as follows by calculating a difference in image density from unused paper using a color reflection densitometer X-rite 404A (manufactured by X-rite Inc.). 0.02 or less is allowed in practice.

G5: The difference in image density is more than 0.04.

G4: The difference in image density is more than 0.03 and 0.04 or less.

G3: The difference in image density is more than 0.02 and 0.03 or less.

G2: The difference in image density is more than 0.01 and 0.02 or less (a value that is allowed in practice).

G1: The difference in image density is 0.01 or less.

Evaluation of Cracks

After performing the evaluation of fogging, the charging roll surface is observed with an optical microscope. Whether or not cracks are present and a crack width are classified as follows. G0 and G1 are allowed in practice.

G2: Cracks having a crack width of 10 μm or more are present.

G1: Cracks are present, but crack widths thereof are less than 10 μm.

Value Allowed in Practice

G0: Cracks are not present.

TABLE 1

| | First Resin (Part(s)) | Second Resin (Part(s)) | Conductive Agent (Part(s)) | Drying Conditions Wind Speed (m/s) | Drying Conditions Dew Point (° C.) | Uneven Distribution Ratio of Conductive Agent (%) | Ratio A (%) | Ratio B (%) | Absorbance Ratio Absorbance aged/ Absorbance ini | Evaluation Resistance Δ | Fogging | Cracks |
|---|---|---|---|---|---|---|---|---|---|---|---|---|
| Comparative Example 1 | 76 | 24 | 13 | 1.4 | 5 | 80 | 35 | 10 | 0.10 | 1.50 | G5 | G0 |
| Comparative Example 2 | 76 | 24 | 13 | 1.4 | 15 | 80 | 35 | 30 | 0.15 | 1.00 | G4 | G0 |
| Comparative Example 3 | 76 | 24 | 13 | 1.4 | 20 | 80 | 35 | 40 | 0.20 | 0.50 | G3 | G0 |
| Example 1 | 76 | 24 | 13 | 0.7 | 5 | 80 | 55 | 55 | 0.27 | 0.45 | G2 | G0 |
| Example 2 | 76 | 24 | 13 | 0.7 | 15 | 80 | 55 | 75 | 0.30 | 0.40 | G2 | G0 |
| Example 3 | 76 | 24 | 13 | 0.7 | 20 | 80 | 55 | 85 | 0.40 | 0.30 | G1 | G0 |
| Example 4 | 80 | 20 | 13 | 0.7 | 5 | 80 | 45 | 55 | 0.25 | 0.48 | G2 | G0 |
| Example 5 | 80 | 20 | 13 | 0.7 | 15 | 80 | 45 | 75 | 0.28 | 0.42 | G2 | G0 |
| Example 6 | 80 | 20 | 13 | 0.7 | 20 | 80 | 45 | 85 | 0.34 | 0.37 | G2 | G0 |
| Example 7 | 65 | 35 | 13 | 0.7 | 5 | 80 | 75 | 55 | 0.30 | 0.40 | G2 | G1 |
| Example 8 | 65 | 35 | 13 | 0.7 | 15 | 80 | 75 | 75 | 0.33 | 0.35 | G2 | G1 |
| Example 9 | 65 | 35 | 13 | 0.7 | 20 | 80 | 75 | 85 | 0.45 | 0.25 | G1 | G1 |
| Example 10 | 76 | 24 | 20 | 0.7 | 5 | 90 | 55 | 55 | 0.29 | 0.42 | G2 | G1 |
| Example 11 | 76 | 24 | 20 | 0.7 | 15 | 90 | 55 | 75 | 0.33 | 0.38 | G1 | G1 |
| Example 12 | 76 | 24 | 20 | 0.7 | 20 | 90 | 55 | 85 | 0.42 | 0.28 | G1 | G1 |
| Example 13 | 76 | 24 | 13 | 1.0 | 5 | 80 | 55 | 50 | 0.25 | 0.48 | G2 | G0 |

From the above results, it can be seen that, in the conductive members according to Examples, an increase in resistance is suppressed.

In addition, it can be seen that, by using the conductive member according to Examples as a charging roller, fogging can be suppressed.

The present exemplary embodiment includes the following aspects.

(((1)))

A conductive member comprising:

a substrate;

an elastic layer provided on the substrate; and a surface layer provided on the elastic layer, in which the surface layer has a sea/island structure that consists of a sea portion containing a first resin and an island portion containing a second resin, a conductive agent is unevenly distributed in an interface between the sea portion and the island portion, in observation of a cross section of the surface layer, a ratio A of a total area of the island portions in a region X from a surface of the surface layer to a depth that is 10% of a film thickness is 40% or more and 80% or less, a linked island portion where two or more of the island portions are linked is present in the region X, and a ratio B of a total area of the linked island portions to the total area of the island portions is 50% or more and 100% or less.

(((2)))

The conductive member according to (((1))), in which the ratio A is 50% or more and 70% or less.

(((3)))

The conductive member according to (((1))), in which the ratio B is 80% or more and 100% or less.

(((4)))

The conductive member according to (((1))), in which the ratio A is 50% or more and 70% or less, and the ratio B is 80% or more and 100% or less.

(((5)))

The conductive member according to (((1))), in which the first resin is polyamide, and the second resin is polyvinyl butyral.

(((6)))

The conductive member according to (((5))), in which an absorbance ratio (absorbance aged/absorbance ini) at an N—H bending vibration (1540 cm$^{-1}$) position derived from amide of the surface layer is 0.20 or more, the absorbance being measured by FT-IR before and after a discharge test in which a voltage of 1.1 kV is applied to the conductive member and the conductive member is discharged to an aluminum element tube while being rotated at a speed of 150 rpm, the absorbance ini represents the absorbance at the N—H bending vibration (1540 cm$^{-1}$) position derived from amide of the measurement sample before the discharge test, and the absorbance aged represents the absorbance at the N—H bending vibration (1540 cm$^{-1}$) position derived from amide of the measurement sample after the discharge test.

(((7)))

The conductive member according to (((6))), in which the absorbance ratio (absorbance aged/absorbance ini) is 0.25 or more.

(((8)))

A charging device comprising:

the conductive member according to any one of (((1))) to (((7))).

(((9)))

A process cartridge comprising:

the charging device according to (((8))); and in which the process cartridge is attachable to and detachable from an image forming apparatus.

(((10)))

An image forming apparatus comprising:

an image carrier;

the charging device according to (((9))) that charges a surface of the image carrier;

an electrostatic latent image forming device that forms an electrostatic latent image on the charged surface of the image carrier;

a developing device that develops the electrostatic latent image formed on the surface of the image carrier with a developer containing toner to form a toner image; and a transfer device that transfers the toner image to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A conductive member comprising:

a substrate;

an elastic layer provided on the substrate; and a surface layer provided on the elastic layer, wherein the surface layer has a sea/island structure that consists of a sea portion containing a first resin and an island portion containing a second resin, a conductive agent is unevenly distributed in an interface between the sea portion and the island portion, in observation of a cross section of the surface layer, a ratio A of a total area of the island portions in a region X from a surface of the surface layer to a depth that is 10% of a film thickness is 40% or more and 80% or less, a linked island portion where two or more of the island portions are linked is present in the region X, and a ratio B of a total area of the linked island portions to the total area of the island portions is 50% or more and 100% or less.

2. The conductive member according to claim 1, wherein the ratio A is 50% or more and 70% or less.

3. A charging device comprising:

the conductive member according to claim 2.

4. A process cartridge comprising:

the charging device according to claim 3; and wherein the process cartridge is attachable to and detachable from an image forming apparatus.

5. The conductive member according to claim 1, wherein the ratio B is 80% or more and 100% or less.

6. A charging device comprising:

the conductive member according to claim 5.

7. A process cartridge comprising:

the charging device according to claim 6; and wherein the process cartridge is attachable to and detachable from an image forming apparatus.

8. The conductive member according to claim 1, wherein the ratio A is 50% or more and 70% or less, and the ratio B is 80% or more and 100% or less.

9. A charging device comprising:

the conductive member according to claim 8.

10. A process cartridge comprising:

the charging device according to claim 9; and wherein the process cartridge is attachable to and detachable from an image forming apparatus.

11. The conductive member according to claim 1, wherein the first resin is polyamide, and the second resin is polyvinyl butyral.

12. The conductive member according to claim 11, wherein an absorbance ratio (absorbance aged/absorbance ini) at an N—H bending vibration ($1540 \ cm^{-1}$) position derived from amide of the surface layer is 0.20 or more, the absorbance being measured by FT-IR before and after a discharge test in which a voltage of 1.1 kV is applied to the conductive member and the conductive member is discharged to an aluminum element tube while being rotated at a speed of 150 rpm, the absorbance ini represents the absorbance at the N—H bending vibration ($1540 \ cm^{-1}$) position derived from amide of the measurement sample before the discharge test, and the absorbance aged represents the absorbance at the N—H bending vibration ($1540 \ cm^{-1}$) position derived from amide of the measurement sample after the discharge test.

13. The conductive member according to claim 12, wherein the absorbance ratio (absorbance aged/absorbance ini) is 0.25 or more.

14. A charging device comprising:

the conductive member according to claim 13.

15. A charging device comprising:

the conductive member according to claim 12.

16. A charging device comprising:

the conductive member according to claim 11.

17. A process cartridge comprising:

the charging device according to claim 16; and wherein the process cartridge is attachable to and detachable from an image forming apparatus.

18. A charging device comprising:

the conductive member according to claim 1.

19. A process cartridge comprising:

the charging device according to claim 18; and wherein the process cartridge is attachable to and detachable from an image forming apparatus.

20. An image forming apparatus comprising:

an image carrier;

the charging device according to claim 19 that charges a surface of the image carrier;

an electrostatic latent image forming device that forms an electrostatic latent image on the charged surface of the image carrier;

a developing device that develops the electrostatic latent image formed on the surface of the image carrier with a developer containing toner to form a toner image; and a transfer device that transfers the toner image to a surface of a recording medium.

* * * * *